United States Patent [19]

Shannon

[11] 4,416,904
[45] Nov. 22, 1983

[54] SHELF STABLE PIZZA AND METHOD FOR PREPARING SAME

[75] Inventor: Edward L. Shannon, Barrington, Ill.

[73] Assignee: The Quaker Oats Company, Chicago, Ill.

[21] Appl. No.: 262,191

[22] Filed: May 11, 1981

[51] Int. Cl.³ .................. A21D 8/00; A21D 15/00
[52] U.S. Cl. .................................. 426/19; 426/94;
        426/335; 426/532; 426/582; 426/589
[58] Field of Search ............... 426/89, 94, 19, 335,
        426/532, 289, 302, 303, 307, 309, 310, 582, 589

[56] References Cited

U.S. PATENT DOCUMENTS

| | | | |
|---|---|---|---|
| 4,038,424 | 7/1977 | Davies | 426/589 |
| 4,075,360 | 2/1978 | Rule et al. | |
| 4,081,555 | 3/1978 | Sawhill | 426/335 |
| 4,104,413 | 8/1978 | Wynn et al. | 426/582 |
| 4,230,687 | 10/1980 | Sair et al. | 426/89 |
| 4,293,572 | 10/1981 | Silva et al. | 426/19 |
| 4,297,378 | 10/1981 | Haasl et al. | 426/532 |

FOREIGN PATENT DOCUMENTS

| | | | |
|---|---|---|---|
| 46-32780 | 9/1971 | Japan | 426/335 |
| 651336 | 4/1967 | Netherlands | 426/335 |

OTHER PUBLICATIONS

Beneke et al., *Food Technology*, Oct. 1955, "Sorbic Acid as a Fungistatic at Different pH Levels ... Tomatoes" pp. 486–488.

Neidig et al., *The Drug and Cosmetic Industry*, Apr. 1944, "Preservatives", pp. 408–410, 481–489.

*Primary Examiner*—Raymond N. Jones
*Assistant Examiner*—Elizabeth A. Hatcher
*Attorney, Agent, or Firm*—Neuman, Williams, Anderson & Olson

[57] ABSTRACT

A shelf stable pizza composite comprising a baked crust component having a pH of not more than about 5.0, a tomato based sauce component having a pH not above about 4.6 and a cheese component having a pH not above about 5.5 and method of preparing same.

7 Claims, No Drawings

SHELF STABLE PIZZA AND METHOD FOR PREPARING SAME

This invention relates to the preparation of shelf stable pizza foods and to stable components thereof.

A cheese pizza consists of three main components; a crust, a sauce and a cheese. Each of these components has specific functions and contributions to the acceptance of the overall pizza. The crust serves as the basic support network for the other two components as well as contributing to the texture and flavor of the pizza. Desirable characteristics for a pizza crust are the ability to provide the desired support, to have a crisp texture when consumed and to have acceptable appearance, flavor and aroma attributes. Moreover, these properties of the crust should be stable and not lost during normal storage and distribution time periods.

Pizza sauce is a tomato based product with appropriate additives. The sauce contains various spices and flavors which give the pizza its identity. A good pizza sauce must possess certain properties which will insure adhesion of the sauce to the crust and the cheese to the sauce, allow the sauce to retain its identity on the pizza and not become mixed with the other components, not be a source of free moisture which would absorb into the crust and it must be acceptable to the consumer.

Cheese contributes to the appearance, flavor and aroma of the pizza. For a shelf stable pizza, the cheese must retain its identity while on the pizza with no distortion of shape or loss of fat during storage at room temperature or above. The cheese must also be stable, both microbiologically and chemically, during storage. When exposed to heat, the cheese should melt rapidly, uniformly and completely; should develop an acceptable brown color and a pleasant cheese type aroma. Also, the cheese should exhibit a soft yet cohesive texture with smooth and easily masticable eating properties.

Distribution of baked or partially baked pizza crusts to restaurants and pizzerias is a quite common procedure in the food industry. The restaurant or pizzeria can then utilize the partially baked crusts as is needed to prepare the complete pizza product. Because baked pizza crusts are subject to mold and yeast growth, precautions must be taken to avoid contamination from the time of production until the crusts are finally used in preparing the pizza. Generally, baked or partially baked pizza crusts are kept under refrigeration to avoid such contamination and deterioration. However, providing adequate means of refrigeration all during the time the crusts are being shipped and stored presents problems, not the least of which is the cost of the refrigeration, including the refrigerating equipment. Accordingly, the art has sought ways to protect baked pizza crust from contamination for considerable periods without resorting to the use of substantially continuous refrigeration. U.S. Pat. No. 3,979,525 is directed to the problem of retarding mold growth on partially baked pizza crusts and attacks the problem by treating the surface of pizza crusts with ethyl alcohol and packaging the treated crusts within a short period of time to avoid vaporization of significant amounts of alcohol. The efficacy of this patented method is apparently dependent upon the presence of the ethyl alcohol on the crusts and if the alcohol escapes by vaporization, the protection against contamination is lost.

The food industry has had very limited success in developing a shelf stable pizza and has generally relied on refrigeration in distribution and storage of these foods. The distribution and storage of frozen pizza results in higher costs to the consumer. Furthermore, the effects of freeze/thaw cycling during such distribution and storage has a very deleterious effect on the final pizza quality.

Shelf stability of pizza and the tomato and cheese pizza components involves three factors, namely (a) the inhibition of growth of bacteria, yeast and molds, (b) minimizing changes in the characteristics of the products due to component interactions such as enzymatic activity or chemical reactions and (c) retention of acceptable sensory characteristics such as aroma, appearance, color, flavor and texture. Heretofore shelf stability for pizza or the pizza components such as tomato sauce and cheese has been achieved by one or more of these three expedients: (1) maintaining the product under refrigeration or by frozen distribution and storage, (2) heating the product before packaging and packaging hot in a sealed container such as a can or glass container, and (3) aseptic processing/packaging. Pizzas or the tomato and cheese components thereof generally have a normal shelf life of from 3 to 12 months when one or more of the above expedients are employed. As used herein, shelf stability involves realization of the factors above mentioned while the product or products are stored at ambient temperatures for a period at least as long as their normal shelf life obtained by employing one or more of the prior art expedients.

It is a major object of this invention to provide a complete pizza having good shelf stability and which requires only heating prior to consumption.

It is another object of the invention to provide pizza components each of which possess good shelf stability along or combined.

It is another object of this invention to provide baked pizza crusts having improved shelf stability or resistance to molding.

It is another object of the invention to provide baked pizza crusts having improved shelf stability which need not be refrigerated or packaged quickly to insure shelf stability.

Another object of the invention is to provide baked frozen pizza crusts having improved shelf stability and desirable appearance, aroma, flavor and texture.

It is still another object of this invention to provide methods for preparing baked pizza crusts which inherently have improved shelf stability.

It is a further object of this invention to provide tomato based pizza sauces having improved shelf stability and which do not require heat processing in a sealed container for microbial stability.

It is another object of the invention to provide tomato based pizza sauces having improved shelf stability and desirable appearance, aroma, flavor and texture.

It is still a further object of this invention to provide methods for preparing tomato based pizza sauces having improved shelf stability.

It is still another object of the invention to provide cheese having improved shelf stability and which requires no refrigerated distribution or storage facilities.

Another object of the invention is to provide cheese having improved shelf stability and desirable appearance, aroma, flavor and texture.

A still further object of this invention is to provide methods for preparing cheese useful as a pizza topping having improved shelf stability.

In accordance with one aspect of the present invention, a crust for pizza and like crusts having improved shelf stability without requiring refrigeration is prepared as follows:

(1) Conventional basic ingredients of a pizza or like crust are combined in suitable mixing equipment in amounts known to be suitable for preparing a dough together with an edible anti-mycotic;

(2) The basic ingredients are mixed with water, as is done in preparation of conventional pizza crust;

(3) After an initial mixing of the basic dough ingredients and anti-mycotic, there is added to the mixture an edible acid in an inactive or protected form so that the acid does not significantly lower the pH until the dough is heated or baked;

(4) Mixing of all of the ingredients is continued until a dough of suitable consistency is obtained; and (5) The dough is baked, preferably after forming into a desired shape and size.

The process according to this invention of preparing baked pizza crust in its broad concept as outlined above results in crusts of improved shelf stability, i.e., improved resistance to microbial growth/activity with minimum change in product characteristics due to component interactions while retaining desirable sensory attributes with respect to flavor, aroma, texture and appearance. The improved shelf stability of the pizza crusts is an inherent feature of the crusts and is not dependent upon additional treatment of crusts after partial baking, or upon particular methods of packaging or storing.

The basic ingredients of a pizza or like crust are, of course, well known to the art and include flour, water, sugar, yeast, salt and fat or shortening. The amounts of the ingredients can vary depending upon preferances, but are conventionally used in amounts which enable the formation of a dough suitable for baking. Conventional mixing equipment, well known in the art, such as, for example, mixers supplied by Hobart, AMF Bakery Systems, Bakers Equipment/Winkler, Inc. and Lavailler Machinery Sales, Inc., can be used with the selection of mixing equipment primarily depending upon the quantity of dough being prepared and equipment availability.

The anti-mycotic agent which is utilized is one acceptable for food use such as calcium or sodium propionate, sorbic acid, sorbate salts such as potassium sorbate, methyl paraben, propyl paraben, and the like. It is particularly preferred to employ a combination of calcium propionate and sorbic acid or its salts as the antimycotic agent in the crust.

An edible acid is utilized in the pizza crust dough according to this invention in an inactive or protected form. By this is meant that the acid is utilized in a form in which it does not result in lowering the pH until the dough is heated or baked. In this way the edible acid does not lower the pH of the pizza crust so as to interfere with yeast activity or gluten development prior to the time the dough is baked.

The acid can be suitably protected by employing it in encapsulated form with the encapsulating agent being, for example, a fat which melts during the baking step. Edible encapsulated acids are commercially available with there being a selection as to the temperature at which the acid is released from its encapsulated form. Thus, for example, citric acid encapsulated in fat is available from Glidden-Durkee Foods, Cleveland, Ohio, in grades identified as 150/85 and 150/70 (the first number indicating the melting temperature of the encapsulating fat and the second number indicating the percent citric acid). Edible acids such as malic, fumaric, tartaric, lactic and phosphoric and the like in a protected form can be employed. The acid is employed in an amount to provide a crust pH of not more than about 5.0, preferably 4.5–4.7.

The dough is baked at conventional baking temperatures such as 425° F. for a short period, such as 3 or 4 minutes, to provide a partially baked crust. Baking of the crust is preferably conducted so as to reduce the moisture content of about 28 to 31%. Moisture contents appreciably lower than about 28% result in a product which is too dry. After cooling, the prebaked crust can be packaged for distribution, preferably using a packaging material with a moisture barrier. Loss of moisture during prolonged storage may result in a hard, dry crust, while a gain in moisture during storage may adversely affect microbial shelf stability. Suitable packaging materials having a moisture barrier, such as paper poly, foil poly, metalized poly esters, high barrier co-extrusions and the like are known in the art and are eminently suitable for packaging of the pizza crust. These packaging materials minimize excessive moisture loss or gain and provide physical support to maintain the integrity of the product and minimize surface contamination of the product. The particular packaging material utilized is not part of the present invention.

The following formulation is illustrative of the ingredients of a pizza crust in accordance with the invention:

| Ingredient | %* |
| --- | --- |
| Flour | 55 to 65 |
| Water | 30 to 45 |
| Sugar | 1.0 to 8 |
| Yeast | 1 to 3 |
| Salt | 0.1 to 1.5 |
| Shortening | 0.0 to 4.00 |
| Protected Acid | 0.10 to 1.00 |
| Antimycotic | 0.05 to 0.30 |

*Throughout the application, percentages are by weight unless otherwise noted.

The following describes a presently preferred method for preparing a partially baked pizza crust:

The base formulation used to prepare a 10—inch pizza crust is as follows:

| Ingredient | % |
| --- | --- |
| Flour | 58.70 |
| Water | 31.81 |
| Dextrose | 4.50 |
| Yeast | 2.20 |
| Salt | 1.00 |
| Shortening | 1.00 |
| Encapsulated citric acid | 0.50 |
| Calcium propionate | 0.19 |
| Sorbic acid | 0.10 |
| | 100.00 |

A dry mix comprising flour, dextrose, shortening, calcium propionate and sorbic acid is mixed in an A-120 Hobart mixer for approximately two minutes. The yeast is added to the water and held for two minutes to solubilize the yeast granules and then the water containing the yeast is added to the mix. Salt is added to the dough approximately two minutes after addition of the water. The encapsulated citric acid is added after the dough has been mixed for five minutes and the dough is then mixed an additional two minutes increasing the total mixing time to approximately seven minutes. The dough is then subdivided into 200 gram dough balls, rolled into 10-inch crusts, placed onto floured cookie sheets, proofed at about 70° to 120° F., preferably about 100° F. for about ½ to 4 hours, preferably 1 hour, and prebaked on a preheated cookie sheet in a 425° F. oven for three minutes without inverting during the prebaking step.

The moisture content before and after baking of the above formulation is approximately 34–36% and 28–31%, respectively. The microbial content of the pizza crust determined before and after baking gives the following typical data:

| Sample | Standard Plate Count | Yeast | Mold |
|---|---|---|---|
| Raw dough | $2.9 \times 10^8$ | $2.9 \times 10^8$ | — |
| Partially baked crust | <10 | <10 | <10 |

In accordance with a second aspect of the invention, a shelf stable tomato based sauce is provided which does not require heat processing in a sealed container for microbial stability.

Tomatoes or tomato based pizza sauces or toppings normally are sealed in metal or glass containers and then heat processed before going into distribution and storage. The heat processing renders the product commercially sterile, thus providing microbial shelf stability. These products retain this stability until opened, after which time refrigerated storage is recommended. The most common spoilage problem associated with tomatoes is mold growth, even during refrigerated storage. Due to the low pH of the system, generally a pH in the range of 4.0 to 4.5, most bacteria will not grow, so in general spoilage due to bacteria is minimal. However, there can be spoilage due to yeast activity since many yeasts can grow at this pH even at refrigerated storage temperatures. Thus, the main spoilage problems of tomato based pizza sauces are related to yeast and mold activity.

A shelf stable tomato based sauce is provided in accordance with this invention by maintaining the pH of a tomato sauce (containing at least 5% natural tomato soluble solids (NTSS)) at a pH not above 4.6 and preferably at a pH of 4.0–4.3 and incorporating in the sauce as an anti-microbial agent a combination of sorbic acid or a salt thereof (or the equivalent) and sodium benzoate. Both sauces containing at least 5% natural tomato soluble solids (NTSS), and imitation tomato sauce products are eminently suitable for use in accordance with the invention. Also, the water activity (Aw) of tomato sauces is generally 0.92 or lower. The use of these anti-microbial agents, in combination with a low pH and the Aw of the system, retards growth of yeast, mold and bacteria of the tomato based sauces.

The sorbic acid or a salt thereof, such as potassium sorbate, is preferably used in an amount of from about 0.05 to 0.20% by weight of the tomato sauce and the sodium benzoate is used in an amount of 0.04 to 0.10% by weight. In addition, methyl or propyl paraben can be employed in lieu of the sorbic acid and its salts. The pH of the sauce is maintained at a pH of not above 4.6 and preferably at a pH of about 4.0–4.3 by either using the inherent pH of the system or through the addition of citric, malic, tartaric, lactic, phosphoric acids or fumaric acids, or similar acids, to lower the pH or bases such as sodium hydroxide to raise the pH.

The following formulation is illustrative of a shelf stable tomato based pizza sauce in accordance with this invention.

| Ingredient | % |
|---|---|
| Tomato paste (31% NTSS) | 29.00 to 48.00 |
| Water | 50.00 to 70.00 |
| Fat | 0.00 to 5.00 |
| Sodium Benzoate | 0.04 to 0.10 |
| Sorbic Acid | 0.05 to 0.20 |
| Seasonings or Spices | 1.00 to 4.00 |

The following describes a presently preferred method for preparing a shelf stable tomato based pizza sauce. The ingredients utilized are as follows:

| Ingredient | % |
|---|---|
| Tomato paste (31% NTSS) | 42.060 |
| Water | 52.160 |
| Fat | 2.933 |
| Sodium Benzoate | 0.067 |
| Sorbic Acid | 0.067 |
| Seasonings or Spices | 2.713 |

The natural tomato sauce is prepared by thinning the tomato paste with water and the remaining ingredients are added. In preparing the natural tomato sauce, fresh whole tomatoes can be substituted for tomato paste as long as the NTSS is maintained above 5%. The sauce may be packaged as such; however, it is preferably and optionally heat processed in bulk prior to packaging. Heat processing may involve heating the sauce to boiling and simmering for up to 1 hour. Water lost during heating is replaced at the end of the heating process. The sauce is cooled to below 25° C. before use or packaging. The heat processing of the sauce improves the overall flavor blend of the product and descreases the initial microbial population which aids in obtaining shelf stability. The sauce need not be heat processed in sealed containers but the packaging should be such so as to provide physical support to contain the product during distribution and storage and prevent moisture transfer in and out of the package. A considerable gain in moisture may have an effect on the microbial stability of the product while a substantial loss in moisture may affect the sensory acceptance of the sauce, that is, loss of moisture may increase viscosity and increase flavor intensity. Suitable packaging materials providing a moisture barrier are well known.

It is also possible to prepare a shelf stable, tomato based pizza sauce in which the consumer may add the desired seasoning or spices. The advantage of this type of sauce is that it would allow the consumer to season the sauce to personal preferences. An illustration of this type of sauce is as follows:

| Ingredient | % |
|---|---|
| Tomato paste | 44.90 |
| Water | 55.00 |
| Sodium benzoate | 0.06 |

-continued

| Ingredient | % |
|---|---|
| Sorbic acid | 0.04 |

To demonstrate microbial stability, ten tomato sauce samples were prepared using various antimycotic agents as follows:

1. 9% NTSS, 0.4% calcium propionate — pH 3.5
2. 9% NTSS, 0.4% calcium propionate — pH 4.2
3. 9% NTSS, 0.4% calcium propionate — pH 5.0
4. 14% NTSS, 0.4% calcium propionate — pH 3.5
5. 14% NTSS, 0.4% calcium propionate — pH 4.2
6. 14% NTSS, 0.4% calcium propionate — pH 5.0
7. 14% NTSS, 0.06% sodium benzoate, 0.04% sorbic acid — pH 3.5
8. 14% NTSS, 0.06% sodium benzoate, 0.04% sorbic acid — pH 5.0
9. 14% NTSS, 0.4% calcium propionate, 0.5% triacetin — pH 4.2
10. 14% NTSS, 0.4% calcium propionate, 0.05% triacetin — pH 5.0

The 9 and 14% NTSS levels are representative of the range of solids normally found in pizza type sauces. The three pH values chosen are based on the normal pH of a tomato sauce which is 4.2–4.3. The higher pH (pH 5.0) may allow for growth of organisms, such as Clostridium, which normally are inhibited at pH 4.6–4.8.

Six thousand gram batches of each sample were prepared using citric acid to lower the pH and sodium hydroxide to raise the pH. In samples 1–3 inclusive 1710 grams of tomato paste and 4290 grams of water were used and in samples 4–10 inclusive 2670 grams of tomato paste and 3330 grams of water were used. All equipment and glassware were washed immediately prior to use in order to minimize contamination of the product. The water used to dilute the 32.2% NTSS tomato paste to the desired test levels was boiled and cooled prior to use. Good manufacturing practices were followed throughout sample preparation. Fifteen hundred grams of each sample was used in the microbial stability studies. The remaining 4500 grams were placed into five quart jars. Three of these jars were placed at 77° F./73% relative humidity and the other two jars at 100° F./80% relative humidity. The 77° F. temperature was chosen as being representative of normal shelf storage temperatures while 100° F. would represent storage conditions in some warehouses during distribution.

The pH, viscosity using a Bostwick viscometer, color profile using the Agtron Color Difference Meter and % soluble solids using an Abbe refractometer were determined on all samples to be used as base values.

The microbial stability of the ten tomato sauces when challenged with different organisms is tabulated below:

| Sample | % NTSS | pH | Inhibitor | Challenge Organisms | | | | | |
|---|---|---|---|---|---|---|---|---|---|
| | | | | A | B | C | D | E | F |
| 1 | 9 | 3.5 | Ca propionate (0.4%) | G | NG | G-D | G-D | NG | NG |
| 2 | 9 | 4.2 | Ca propionate (0.4%) | G | NG | G-D | G-D | D | D |
| 3 | 9 | 5.0 | Ca propionate (0.4%) | G-D | D | G-D | G-D | D | D |
| 4 | 14 | 3.5 | Ca propionate (0.4%) | NG | NG | G-D | G-D | NG | NG |
| 5 | 14 | 4.2 | Ca propionate (0.4%) | G-D | NG | G-D | G-D | D | D |
| 6 | 14 | 5.0 | Ca propionate (0.4%) | G-D | D | G-D | G-D | D | D |
| 7 | 14 | 3.5 | Na benzoate: (0.06%) sorbic acid (0.04%) | NG | NG | NG | NG | NG | NG |
| 8 | 14 | 5.0 | Na benzoate: (0.06%) sorbic acid (0.04%) | G | NG | G | G-D | NG | NG |
| 9 | 14 | 4.2 | Ca propionate: (0.4%) triacetin (0.5%) | G | NG | G-D | G-D | NG | NG |
| 10 | 14 | 5.0 | Ca propionate: (0.4%) triacetin (0.5%) | G-D | D | G-D | G-D | D | D |

% NTSS — % Natural Tomato Soluble Solids
Inhibitor Levels - Calcium propionate 0.4%
Sodium benzoate:sorbic acid 0.06:0.04%

Challenge Organisms:
A — *Lactobacillus plantarioum*
B — *Bacillus stearothermophilus*
C — *Torula utilis* (yeast)
D — *Aspergillus niger* (mold)
E — *Staphylococcus aureus*
F — Uninoculated (control)

Stability Code:
G — Growth
G-D — Growth, discarded due to inoculated organism
D — Discarded, not due to inoculated organism
NG — No growth As seen from the above, the only completely stable sauce was sauce No. 7.

Samples were stored at 77° and 100° F. to observe stability of the systems. Samples 3, 6 and 10 were discarded after four days' storage due to excessive gas production and development of a fermented aroma. These were sauces at pH 5.0 containing calcium propionate as an inhibitor. Sample 8, also at pH 5 but containing Na benzoate:sorbic acid, was stable after four days. After three weeks' storage, Samples 1, 2, 4, 5 and 9 held at 77° F. were discarded due to mold growth. Samples 7 and 8, containing Na benzoate:sorbic acid, had no visible mold growth after three weeks.

Another microbial stability test was performed on six tomato sauce samples which were as follows:

| Sample | |
|---|---|
| 1 | pH 4.2 0.06% sodium benzoate, 0.04% sorbic acid |
| 2 | pH 4.2 0.10% sodium benzoate, 0.067% sorbic acid |
| 3 | pH 4.2 0.10% sodium benzoate, 0.10% sorbic acid |
| 4 | pH 3.5 0.06% sodium benzoate, 0.04% sorbic acid |
| 5 | pH 3.5 0.10% sodium benzoate, 0.067% sorbic acid |
| 6 | pH 3.5 0.10% sodium benzoate, 0.10% sorbic acid |

The % NTSS was held constant at 14%.

The results of this study show that under the conditions of this test, all six of these samples were microbiologically stable for 28 days.

| | SPC (days) | | Yeast (days) | | Mold (days) | | Staphylococcus (days) | | Lactobacillus (days) | |
|---|---|---|---|---|---|---|---|---|---|---|
| Sample | 0 | 28 | 0 | 28 | 0 | 28 | 0 | 28 | 0 | 28 |
| 1-Control | * | * | * | * | * | * | * | * | * | * |
| Inoculated | — | — | $9.6 \times 10^4$ | * | $1.4 \times 10^3$ | * | $7.1 \times 10^3$ | * | $2 \times 10^3$ | $5.9 \times 10^3$ |
| 2-Control | 20 | * | * | * | * | * | * | * | * | * |
| Inoculated | — | — | $8.8 \times 10^4$ | * | $2 \times 10^2$ | * | $7 \times 10^3$ | * | $1.5 \times 10^3$ | * |
| 3-Control | 60 | * | * | * | * | * | * | * | * | * |
| Inoculated | — | — | $7.9 \times 10^4$ | * | $1 \times 10^3$ | * | $3 \times 10^3$ | * | $2.3 \times 10^3$ | * |
| 4-Control | * | * | * | * | * | * | * | * | * | * |
| Inoculated | — | — | $5.6 \times 10^4$ | * | $7 \times 10^2$ | * | $1 \times 10^3$ | * | $2.5 \times 10^3$ | * |
| 5-Control | * | * | * | * | * | * | * | * | * | * |
| Inoculated | — | — | $7 \times 10^4$ | * | * | * | $1.1 \times 10^2$ | * | $1.8 \times 10^3$ | * |
| 6-Control | * | * | * | * | * | * | * | * | * | * |
| Inoculated | — | — | $2.8 \times 10^4$ | * | * | * | 40 | * | $1.8 \times 10^3$ | * |

*Less than $10^2$

In accordance with another aspect of the invention, a shelf stable cheese for use as a pizza topping is provided.

The cheese as related to this invention is either mozzarella or pizza cheese normally used in Italian type foods such as pizza and lasagna. These are both soft, fresh Italian cheeses which can vary in composition depending upon market demands. These variations are related to the % moisture and % fat in the cheese. The % moisture is controlled by varying the process used in the manufacture of the cheese. The percent fat in the milk used to make the cheese controls the final fat content of the cheese. Current classifications include skimmed milk, low fat and standard (whole milk) cheeses. Recently imitation mozzarella or pizza cheeses have been developed. These have characteristics similar to the natural cheese, but are based on a combination of ingredients from dairy and non-dairy sources to make the cheese.

As discussed herein, the shelf stable cheese relates primarily to either the natural or imitation mozzarella or pizza type cheeses. The main characteristics of these cheeses is that during heating, the mass remains homogeneous, is fluid, and is cohesive and stringy when stretched. The flavor of the cheese is mild since it is normally used within 3 months after manufacture. Other cheeses such as for example cheddar, swiss or bleu cheeses can be used in combination with the pizza type cheeses to achieve a particular flavor.

As with most dairy products, cheese is not considered a shelf stable product due to undesired microbial, physical and chemical changes which can occur during storage at room temperature. These include mold growth, growth of undesired bacteria, separation of the fat from the curd mass and enzymatic activity. Thus, cheese is normally stored under refrigeration. Many of these changes continue to occur, but at the lower temperatures the reaction rates are much slower. In some cases, these controlled changes are desired, such as the development of flavors in many varieties of cheese. However, in a cheese such as mozzarella, the cheese is normally used as a young cheese (2-10 weeks), as a bland flavor is desired. Even with this cheese, as it ages these few weeks, undesired flavor and texture changes occur. The flavor becomes less bland, more bitter, with a loss in the cohesive/stringy texture characteristics of the cheese.

There are some processed cheeses which possess shelf stability by virtue of being processed at pasteurization temperatures rendering them commercially sterile. While still hot, the processed cheese is packaged and the package sealed, maintaining this sterility. Some antimicrobial agents, such as sorbic acid or its salts, may be added during processing to aid in protecting the cheese from mold growth. The main stability, however, is achieved by the heat treatment and the sterile packaging. Once the protective package is opened, the stability is decreased and refrigeration is recommended.

A shelf stable cheese for use as a pizza ingredient is provided in accordance with this invention by maintaining the pH of the cheese at a pH not above 5.5, preferably 5.4-5.1 and by incorporating therein an antimycotic such as sorbic acid, potassium sorbate, sodium benzoate, methyl or propyl parabens and the like. These antimicrobial agents are employed in amounts of from about 0.04 to 0.10 by weight. The pH of the cheese can be maintained at a relatively low level by the addition of acidic materials such as adipic, citric acid, lactic acid, hydrochloric, malic, fumaric or tartaric acids and the like. When the pH of cheese decreases, the cheese becomes more fluid and may have a tendency to flow off the pizza during baking. To prevent an undesirable decrease in viscosity, flour can be added to the cheese formulation in an amount from about 0.5 to 4.0 by weight.

To prepare the shelf stable cheese, the cheese is heated to a temperature on the order of 160°-180° F. which results in a free flowing mass into which the other ingredients are easily incorporated. Heating of the cheese results in some moisture loss and the moisture loss can be replaced by adding to the cheese, water, margarine or propylene glycol or similar materials.

If necessary or desirable, emulsifiers and gelling-/firming agents may be added to obtain desired product characteristics. Emulsifiers such as sodium citrate, disodium phosphate, trisodium phosphate and sodium hexametaphosphate are used in the cheese industry. The type or combination of emulsifiers used influences cheese characteristics such as firmness, melting, slicing, and flavor. Examples of gelling/firming agents include starches, proteins and flours such as, for example, those described in U.S. Pat. No. 4,104,413 issued to Wynn et al. These emulsifiers generally result in an upward shift in pH and accordingly sufficient acid must be used to counteract this and maintain the pH below about 5.5.

The following are examples of shelf stable cheeses in accordance with this invention:

EXAMPLE 1

| Ingredient | % By Weight |
|---|---|
| Mozzarella cheese | 92.8 |
| Salt | 1.0 |
| Sorbic acid | 0.1 |
| Sodium benzoate | 0.1 |
| Sodium citrate | 2.0 |
| Pregelatinized tapioca starch | 3.0 |
| Adipic acid | 1.0 |

EXAMPLE 2

| Ingredient | % By Weight |
|---|---|
| Mozzarella cheese | 46.4 |
| Imitation mozzarella cheese | 46.4 |
| Salt | 1.0 |
| Sorbic acid | 0.1 |
| Sodium benzoate | 0.1 |
| Sodium citrate | 2.0 |
| Tapioca flour | 3.0 |
| Adipic acid | 1.0 |

EXAMPLE 3

| Ingredient | % By Weight |
|---|---|
| Imitation mozzarella cheese | 92.8 |
| Salt | 1.0 |
| Sorbic acid | 0.1 |
| Sodium benzoate | 0.1 |
| Sodium citrate | 2.0 |
| Tapioca flour | 3.0 |
| Adipic acid | 1.0 |

To demonstrate the stability of cheese prepared in accordance with this invention, six cheese samples were prepared using the base formulations shown below:

| | Base Formulations | |
|---|---|---|
| Ingredient | Samples 1-3 (%) | Samples 4-6 (%) |
| Low moisture part skim mozzarella cheese | 93.3 | 92.8 |
| Salt | 1.0 | 1.0 |
| Sorbic acid | 0.1 | 0.1 |
| Sodium benzoate | 0.1 | 0.1 |
| Sodium citrate | 2.0 | 2.0 |
| Pregelatinized tapioca starch | 3.0 | 3.0 |
| Adipic acid | 0.5 | 1.0 |
| | 100.0 | 100.0 |

In preparing these formulations, the cheeses were heated to a temperature of 165°–175° F. resulting in loss of moisture. The lost moisture was replaced as shown below:

| Sample | Description | Final % Moisture | pH |
|---|---|---|---|
| 1 | Replaced moisture lost during processing with water. | 42.71 | 5.37 |
| 2 | Replaced moisture lost during processing with margarine. | 37.92 | 5.38 |
| 3 | Replaced moisture lost during processing with equal proportions of margarine and propylene glycol. | 38.79 | 5.37 |
| 4 | Replaced moisture lost during processing with water. | 40.73 | 5.08 |
| 5 | Replaced moisture lost during processing with margarine. | 38.05 | 5.08 |
| 6 | Replaced moisture lost during processing with equal proportions of margarine and propylene glycol. | 35.91 | 5.12 |

The six cheese formulations were challenged with *Staphylococcus epidermidis, Escherichia coli, Torula utilis, Aspergillus niger, Streptococcus thermophilus* and *Lactobacillus bulgaricus*. The samples were incubated at 35° C. (bacteria) and 25° C. (yeast and mold) for eight weeks. The samples were assayed at 0, 1, 2, 3, 4, 5, 6 and 8 week time intervals for Total Plate Count (TPC), *E. coli*, Staphylococcus, Yeast and Mold, and Lactobacilli.

These cheese products were considered microbiologically stable for the 8 weeks of storage under the conditions of this test. The data is summarized in the following table:

| | Microbial Stability of Control and Inoculated Processed Mozzarella Cheese Systems | | | | | | | | | | |
|---|---|---|---|---|---|---|---|---|---|---|---|
| | SPC (wks) | | Staph (wks) | | *E. Coli* (wks) | | Yeast (wks) | | Mold (wks) | | Lactic (wks) |
| Sample | 0 | 8 | 0 | 8 | 0 | 8 | 0 | 8 | 0 | 8 | 0 | 8 |
| 1-C[1] | $3.3 \times 10^3$ | $1.1 \times 10^3$ | * | * | * | * | * | * | * | * | * | * |
| 1-I[2] | — | — | $3.0 \times 10^4$ | * | $1.3 \times 10^4$ | * | $4.0 \times 10^3$ | * | $1.1 \times 10^3$ | * | $1.1 \times 10^4$ | * |
| 2-C | $2.0 \times 10^3$ | $3.2 \times 10^2$ | * | * | * | * | * | * | * | * | * | * |
| 2-I | — | — | $6.0 \times 10^4$ | * | $2.0 \times 10^4$ | * | $1.0 \times 10^3$ | * | $1.3 \times 10^3$ | * | $9.3 \times 10^3$ | * |
| 3-C | $1.4 \times 10^3$ | $9.8 \times 10^2$ | * | * | * | * | * | * | * | * | * | * |
| 3-I | — | — | $6.0 \times 10^4$ | * | $1.8 \times 10^4$ | * | $6.0 \times 10^3$ | * | $4.0 \times 10^2$ | * | $1.3 \times 10^4$ | 8 |
| 4-C | $7.0 \times 10^2$ | $6.0 \times 10^2$ | * | * | * | * | * | * | * | * | * | * |
| 4-I | — | — | $7.0 \times 10^4$ | * | $7.0 \times 10^3$ | * | $7.0 \times 10^3$ | * | $1.3 \times 10^3$ | * | $8.7 \times 10^3$ | * |
| 5-C | $5.0 \times 10^2$ | $9.0 \times 10^2$ | * | * | * | * | * | * | * | * | * | * |
| 5-I | — | — | $5.0 \times 10^4$ | * | $3.1 \times 10^4$ | * | $3.0 \times 10^3$ | * | $7.0 \times 10^2$ | * | $1.1 \times 10^4$ | * |
| 6-C | $7.0 \times 10^2$ | $5.0 \times 10^2$ | * | * | * | * | * | * | * | * | * | * |
| 6-I | — | — | $8.0 \times 10^4$ | * | $1.7 \times 10^4$ | * | $3.0 \times 10^3$ | * | $5.0 \times 10^2$ | * | $9.6 \times 10^3$ | * |

[1]C = Control
[2]I = Inoculated
* = $<10^2$ for Staphylococcus, <10 for all others
— = Not determined This invention makes possible the formulation of three basic ingredients of pizza; the crust, tomato sauce and cheese topping, all of which possess significantly improved shelf stability. The pizza ingredients can be distributed individually packaged so that the consumer can merely combine the ingredients to prepare the ultimate pizza food. Alternatively, the shelf stable pizza components can be combined and distributed as a complete pizza so that the ultimate consumer need only heat or bake the pizza prior to consumption. Of course, the consumer can add to the pizza additional ingredients such as particular spices, peppers, sausage, anchovies, mushrooms and the like to satisfy individual preferences. A significant advantage of this invention is that the pizza components retain shelf stability attributes when packaged and distributed as separate entities or when combined as a complete pizza article.

Microbial stability studies were made with pizzas, the crusts of which were made of two formulations, one containing 0.19% calcium propionate and one containing 0.19% calcium propionate and 0.10% sorbic acid. Encapsulated citric acid was used to lower the pH of both crusts to 4.6±0.1. The sauce and cheese formulations were the same for both crusts. The formulations for these components is shown below.

The crust weight of these pizzas was 180±5 grams with 125 grams of sauce and 125 grams of cheese added to each crust. Prior to addition to the crust, the sauce was inoculated with a suspension containing yeast and mold, and the cheese was sprayed with a solution containing *E. coli*, a staphylococcus and a bacillus. The pizzas were then shrink-wrapped and placed into storage. The challenged product was stored at 35° C. Control (uninoculated) products were stored at 77° F./73% relative humidity.

| Pizza Formulations | | |
|---|---|---|
| Crust | | |
| Ingredient | # I % | # II % |
| FFR Flour | 59.00 | 59.00 |
| Water | 31.91 | 31.81 |
| Dextrose | 4.50 | 4.50 |
| Yeast (granular) | 2.00 | 2.00 |
| Salt | 1.00 | 1.00 |
| Fat | 1.00 | 1.00 |
| Encapsulated citric acid | 0.40 | 0.40 |
| Calcium propionate | 0.19 | 0.19 |
| Sorbic acid | — | 0.10 |
| | 100.00 | 100.00 |

| Sauce | |
|---|---|
| Ingredient | % |
| Tomato paste | 41.773 |
| Water | 51.660 |
| Fat | 2.900 |
| Gums (Guar, Xantham, Locust Bean Gums) | 0.300 |
| Pregelatinized Starch | 0.500 |
| Sodium benzoate | 0.100 |
| Sorbic acid | 0.067 |
| Oregano | 0.350 |
| Sugar | 0.233 |
| Salt | 1.748 |
| Black pepper | 0.058 |
| Onion Powder | 0.175 |
| Garlic Powder | 0.058 |
| Basil | 0.091 |
| | 100.013 |

| Cheese | |
|---|---|
| Ingredient | % |
| Mozzarella cheese | 92.8 |
| Sodium citrate | 0.2 |
| Tapioca flour | 3.0 |
| Adipic acid | 1.0 |
| Salt | 1.0 |
| Sorbic acid | 0.1 |
| Sodium benzoate | 0.1 |
| | 100.0 |

Within 14 days, the pizzas containing only calcium propionate in the crusts were moldy (Pizza I). The pizzas containing the inhibitors in the crust according to the invention visually showed no microbial deterioration after eight weeks (Pizza II). The microbial data obtained on this pizza during the 58 day storage study is summarized in the table below. Pizza II was considered microbiologically stable within the limits of the test. There was a gradual die-off of total bacteria to the zero base of $2 \times 10^3$. Specific inoculated organisms could not be detected after 5 days storage.

| Sample | SPC* 0 days | SPC* 58 days | S. epidermidis 0 days | S. epidermidis 58 days | E. coli 0 days | E. coli 58 days | Yeast 0 days | Yeast 58 days | Mold 0 days | Mold 58 days |
|---|---|---|---|---|---|---|---|---|---|---|
| Control Cheese | $5.0 \times 10^2$ | $4.1 \times 10^2$ | $<10^2$ | $<10^2$ | $<10$ | $<10$ | $<10$ | $<10$ | $<10$ | $<10$ |
| Control Sauce | $4.1 \times 10^3$ | $6.8 \times 10^3$ | $<10^2$ | $<10^2$ | $<10$ | $<10$ | $<10$ | $<10$ | $<10$ | $<10$ |
| Control Crust I | $9.7 \times 10^3$ | 25 | $<10^2$ | $<10^2$ | $<10$ | $<10$ | $5.5 \times 10^3$ | $<10$ | $<10$ | $<10$ |
| Control Crust II | $5.0 \times 10^2$ | 12 | $<10^2$ | $<10^2$ | $<10$ | $<10$ | $1.0 \times 10^3$ | $<10$ | $<10$ | $<10$ |
| Control Pizza I | $1.2 \times 10^4$ | $8.9 \times 10^4$ | $<10^2$ | $<10^2$ | $<10$ | $<10$ | $7.7 \times 10^3$ | $1.1 \times 10^3$ | $<10$ | TNTC |
| Control Pizza II | $1.8 \times 10^3$ | $1.9 \times 10^3$ | $<10^2$ | $2.0 \times 10^2$ | $<10$ | $<10$ | $1.4 \times 10^2$ | $<10$ | $<10$ | $<10$ |
| Inoculated Cheese | $2.1 \times 10^5$ | $1.8 \times 10^2$ | $1.9 \times 10^5$ | $<10^2$ | $<10$ | $<10$ | $1.5 \times 10^2$ | $<10$ | $<10$ | $<10$ |
| Inoculated Sauce | $3.9 \times 10^3$ | $3.9 \times 10^3$ | $<10^2$ | $<10^2$ | $<10$ | $<10$ | $1.8 \times 10^4$ | $<10$ | $2.2 \times 10^5$ | $<10$ |
| Inoculated Pizza IA | $2.2 \times 10^4$ | $1.0 \times 10^4$ | $3.0 \times 10^2$ | $9.6 \times 10^2$ | $<10$ | $<10$ | $1.1 \times 10^4$ | 80 | $4.3 \times 10^4$ | TNTC |
| Inoculated Pizza IB | $2.3 \times 10^4$ | $1.1 \times 10^3$ | $2.2 \times 10^2$ | $<10^2$ | $<10$ | $<10$ | $1.1 \times 10^4$ | $<10$ | $4.0 \times 10^4$ | TNTC |
| Inoculated Pizza IIA | $3.3 \times 10^4$ | $3.6 \times 10^3$ | $1.9 \times 10^2$ | $<10^2$ | $<10$ | $<10$ | $9.0 \times 10^3$ | $<10$ | $3.5 \times 10^4$ | $<10$ |
| Inoculated | $2.3 \times 10^4$ | $3.9 \times 10^3$ | $2.1 \times 10^2$ | $<10^2$ | $<10$ | $<10$ | $8.1 \times 10^3$ | $<10$ | $3.8 \times 10^4$ | $<10$ |

| | SPC* | | S. epidermidis | | E. coli | | Yeast | | Mold | |
|---|---|---|---|---|---|---|---|---|---|---|
| Sample | 0 days | 58 days | 0 days | 58 days | 0 days | 58 days | 0 days | 58 days | 0 days | 58 days |
| Pizza IIB | | | | | | | | | | |

*Standard Plate Count

In accordance with one embodiment of the invention, tomato sauce is placed directly on top of the crust in the preparation of pizza. Even though the Aw of the systems are similar, there may be physical migration of water from the sauce into the crust. This water may result in undesired textural changes in the crust. Application of a physical water barrier to the surface of the crust to minimize direct contact between the two components aids in retaining the crust characteristics. Examples of such barriers are edible films, such as those formed by alginates, polysaccharide, proteins, or higher melting point fats. This includes fats with a melting point in the range of 95°–120° F. with a 100°–110° F. range preferred. Fat is preferred in this application because it does provide the desired protection during storage and upon heating of the pizza for consumption, the fat becomes a liquid. Since most pizzas are consumed warm, the fat remains in a sensory acceptable liquid form. The level of fat used may vary between 2 to 6 percent of the crust weight with 3.75 percent preferred in this application. The level of fat will vary depending on the top surface area of the crust.

The advantages of the invention are numerous. Shelf stable pizza ingredients are made available which can be distributed and stored for extended periods without the need of refrigeration. The pizza components can be distributed individually or as a complete cheese/tomato pizza while retaining the desired shelf stability characteristics. The ease of packaging the pizza components having the improved shelf stability is readily apparent. The packaging material employed should be one which prevents excessive loss or gain of moisture and such materials are readily available. The shelf stable crusts need not be rapidly packaged under sterile conditions. The tomato paste can be packaged in other than metal containers and heat processing of the sauce after packaging is eliminated. The pizza components need not be refrigerated after opening as is the case with conventional pizza ingredients. It will be appreciated that shelf stable food products prepared in accordance with this invention can be used in the preparation of foods other than pizzas.

Those modifications and equivalents which fall within the spirit of the invention are to be considered a part thereof.

What is claimed is:

1. A pizza food comprising in combination a baked crust component, a tomato based sauce component and a cheese topping component, each of the said components possessing shelf stability at ambient temperature;
   (a) said baked crust component containing flour, yeast, fat, an anti-mycotic agent and an edible acid in an amount sufficient to afford a crust having a pH of not more than about 5.0,
   (b) said tomato based sauce component having a pH not above about 4.6 and containing at least 5% of natural tomato soluble solids and an amount of an edible anti-mycotic sufficient to retard microbial growth, and
   (c) said cheese component having a pH not above about 5.5 and containing an edible anti-mycotic in an amount sufficient to retard microbial growth.

2. A pizza food in accordance with claim 1 wherein said crust component contains as an anti-mycotic agent a combination of calcium propionate and sorbic acid.

3. A pizza food comprising in combination a baked crust component, a tomato based sauce component and a cheese topping component, each of the said components possessing shelf stability at ambient temperature;
   (a) said baked crust component containing flour, yeast, fat, an anti-mycotic agent and an edible acid in an amount sufficient to afford a crust having a pH of not more than about 5.0,
   (b) said tomato based sauce component having a pH not above about 4.6 and containing at least 5% of natural tomato soluble solids and a combination of sodium benzoate and sorbic acid or a salt thereof, or methyl paraben or propyl paraben in an amount to retard microbial growth; and
   (c) said cheese component having a pH not above about 5.5 and containing an edible anti-mycotic in an amount sufficient to retard microbial growth.

4. A process for producing pizza food comprising:
   (a) forming a dough from water, flour, yeast, fat, an anti-mycotic agent and a protected edible acid,
   (b) proofing the dough and
   (c) baking the dough to form a crust,
   (d) placing onto the baked crust a sufficient amount of a tomato based sauce component as defined in claim 1, and
   (e) placing onto the baked crust and tomato based sauce component a sufficient amount of a cheese component as defined in claim 1.

5. A process for producing pizza food comprising:
   (a) forming a dough from water, flour, yeast, fat, an anti-mycotic agent and a protected edible acid,
   (b) proofing the dough and
   (c) baking the dough to form a crust,
   (d) coating the top surface of the baked crust with a water barrier film
   (e) placing onto the baked crust a sufficient amount of a tomato based sauce component as defined in claim 1, and
   (f) placing onto the baked crust and tomato based sauce component a sufficient amount of a cheese component as defined in claim 1.

6. A process for producing pizza food comprising mixing in dry form flour, fat and an anti-mycotic agent,
   (a) adding to the dry mix water containing yeast,
   (b) mixing the ingredients,
   (c) then adding salt to the mixture,
   (d) then adding a protected acid,
   (e) mixing all of the above said ingredients,
   (f) proofing the dough,
   (g) then baking the dough for a short period to form a baked crust,
   (h) placing thereon the baked crust resulting from step (g) a sufficient amount of a tomato based sauce as defined in claim 1, and (i) placing onto said crust a sufficient amount of a cheese component as defined in claim 1.

7. A process for producing pizza food comprising mixing in dry form flour, fat, calcium propionate and sorbic acid,
    (a) adding to the dry mix water containing yeast,
    (b) mixing the ingredients,
    (c) then adding salt to the mixture,
    (d) then adding a protected acid,
    (e) mixing all of the above said ingredients,
    (f) proofing the dough,
    (g) then baking the dough for a short period to form a baked crust,
    (h) placing thereon the baked crust resulting from step (g) a sufficient amount of a tomato based sauce as defined in claim 1, and
    (i) placing onto said crust a sufficient amount of a cheese component as defined in claim 1.

* * * * *

UNITED STATES PATENT AND TRADEMARK OFFICE
CERTIFICATE OF CORRECTION

PATENT NO. : 4,416,904
DATED : November 22, 1983
INVENTOR(S) : EDWARD L. SHANNON It is certified that error appears in the above-identified patent and that said Letters Patent are hereby corrected as shown below:

Column 17, line 1, after "crust" insert -- from step (h) --

Column 18, line 8, after "crust" insert -- from step (h) --

Signed and Sealed this

Seventh Day of February 1984

[SEAL]

Attest:

GERALD J. MOSSINGHOFF

Attesting Officer     Commissioner of Patents and Trademarks